United States Patent
Oshita et al.

(10) Patent No.: US 10,525,386 B2
(45) Date of Patent: Jan. 7, 2020

(54) FILTER DEVICE

(71) Applicant: YAMASHIN-FILTER CORP., Kanagawa (JP)

(72) Inventors: Tatsuhiro Oshita, Kanagawa (JP); Meiho Taku, Kanagawa (JP); Makoto Ishizuka, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 10 days.

(21) Appl. No.: 15/953,539

(22) Filed: Apr. 16, 2018

(65) Prior Publication Data

US 2018/0229162 A1 Aug. 16, 2018

Related U.S. Application Data

(63) Continuation of application No. PCT/JP2016/079433, filed on Oct. 4, 2016.

(30) Foreign Application Priority Data

Oct. 30, 2015 (JP) ................. 2015-214490

(51) Int. Cl.
*B01D 35/147* (2006.01)
*B01D 29/07* (2006.01)
(Continued)

(52) U.S. Cl.
CPC ......... *B01D 35/1475* (2013.01); *B01D 29/07* (2013.01); *B01D 29/114* (2013.01);
(Continued)

(58) Field of Classification Search
CPC ............. B01D 35/1475; B01D 36/001; B01D 19/0031; B01D 2201/0453;
(Continued)

(56) References Cited

U.S. PATENT DOCUMENTS

| 2006/0053756 | A1 | 3/2006 | Hawkins et al. | |
| 2010/0288688 | A1* | 11/2010 | Bryson | B01D 27/103 210/254 |
| 2016/0074778 | A1* | 3/2016 | Herman | B01D 35/147 210/436 |

FOREIGN PATENT DOCUMENTS

| CN | 202228338 U | 5/2012 |
| JP | H10-159530 A | 6/1998 |

(Continued)

OTHER PUBLICATIONS

International Search Report issued in PCT/JP2016/079433 dated Dec. 20, 2016 with English Translation (3 pages).

(Continued)

*Primary Examiner* — Terry K Cecil
(74) *Attorney, Agent, or Firm* — Nakanishi IP Associates, LLC

(57) ABSTRACT

When a lid covers an opening portion formed at an upper end of a filter case with a bottomed substantially cylindrical shape inside which a filter element is disposed, the internal space between the lid and the filter case is formed. A bypass flow path connecting the internal space and outside space is formed in the lid, and a relief valve disposed moveably between a position closing the bypass flow path and a position opening the bypass flow path includes an air bleeder formed from a porous material.

4 Claims, 12 Drawing Sheets

(51) Int. Cl.
    *B01D 29/11*      (2006.01)
    *B01D 29/58*      (2006.01)
    *B01D 36/00*      (2006.01)
    *F15B 1/26*      (2006.01)
    *F15B 21/041*      (2019.01)

(52) U.S. Cl.
    CPC ............ *B01D 29/58* (2013.01); *B01D 36/001* (2013.01); *B01D 2201/0453* (2013.01); *B01D 2201/12* (2013.01); *B01D 2201/16* (2013.01); *F15B 1/26* (2013.01); *F15B 21/041* (2013.01)

(58) Field of Classification Search
    CPC ............ B01D 2201/12; B01D 2201/16; B01D 24/00; B01D 29/00; B01D 29/07; B01D 29/11; B01D 29/114; B01D 29/50; B01D 29/58; B01D 35/147; F15B 1/26; F15B 21/041
    See application file for complete search history.

(56) References Cited

FOREIGN PATENT DOCUMENTS

| | | |
|---|---|---|
| JP | 2009-214005 A | 9/2009 |
| JP | 2011-218252 A | 11/2011 |
| JP | 2014-188430 A | 10/2014 |
| WO | 2014/172145 A1 | 10/2014 |

OTHER PUBLICATIONS

Written Opinion of International Searching Authority issued in PCT/JP2016/079433, dated Dec. 20, 2016 (3 pages).

Extended European Search Report issued in European Patent Application No. 16859498.4 dated Nov. 6, 2018 (7 pages).

Written Opinion of International Searching Authority issued in PCT/JP2016/079433, dated Dec. 20, 2016, with English Translation (7 pages).

* cited by examiner

FILTER DEVICE

CROSS-REFERENCE TO RELATED APPLICATIONS

This application is a continuation application of International Patent Application No. PCT/JP2016/079433 filed on Oct. 4, 2016, which claims priority to Japanese Patent Application No. 2015-214490 filed on Oct. 30, 2015, the entire contents of which are incorporated by reference.

TECHNICAL FIELD

The present invention relates to a filter device.

BACKGROUND ART

Patent Document 1 discloses an oil filter including an element cover mountable inside a filter case while being connected to a filter element disposed inside the filter case, relief oil channel, and a relief valve, the element cover including a relief oil channel running from space between the filter element and the filter case, through an element upper portion center hole, and communicating with internal space of the filter element, and a relief valve.

CITATION LIST

Patent Document

Patent Document 1: JP 2009-214005 A

In the invention described in Patent Document 1, oil prior to filtration enters the space (referred to as "internal space" below) between the filter element and the filter case. However, bubbles (air) contained in the oil can cause air to collect in an upper portion of the internal space. The function of the relief valve can be negatively affected by air collected in the internal space being located at or near the relief valve.

In light of the above, an object of the one or more embodiment of the present invention is to provide a filter device capable of discharging air collected in an internal space.

SUMMARY OF INVENTION

A filter device according to one or more embodiment of the present invention includes, for example: a filter element including a filtration member with a substantially cylindrical shape; a filter case with a bottomed substantially cylindrical shape inside which the filter element is disposed; a lid that covers an opening portion formed at an upper end of the filter case and defines an internal space between the lid and the filter case, a bypass flow path connecting the internal space and an outside space of the filter case being formed in the lid; and a relief valve disposed moveably between a position closing the bypass flow path and a position opening the bypass flow path, the relief valve including an air bleeder formed from a porous material.

According to a filter device of one or more embodiment of the present invention, when the lid covers the opening portion formed at the upper end of the filter case with a bottomed substantially cylindrical shape inside which the filter element is disposed, the internal space between the lid and the filter case is formed. The bypass flow path connecting the internal space and the outside space is formed in the lid, and the relief valve disposed moveably between a position closing the bypass flow path and a position opening the bypass flow path includes the air bleeder formed from a porous material. In this way, air collected in the internal space of the filter case can be discharged to the outside space.

Here, a hole defining the bypass flow path is formed in the lid; the relief valve is a plate-like portion that covers the hole and is formed entirely from the porous material. Accordingly, because the relief valve itself functions as an air bleeder, a simple configuration can be achieved.

Here, a hole defining the bypass flow path is formed in the lid; the relief valve covers the hole; a through-hole that connects the internal space and the outside space is formed in the through-hole; and the air bleeder is disposed covering the through-hole. In this way, the air bleeder member can be replaced, and the air discharge performance can be maintained.

Here, the filter element includes an upper plate that covers an upper end surface of the filtration member; the air bleeder is disposed on the upper plate; and the air bleeder covers the through-hole when the lid is attached to the filter case. Accordingly, the filter element and the air bleeder can be replaced at the same time.

Here, the filter element includes, the filtration member, a second filtration member disposed inward of the filtration member and coaxial with the filtration member, the second filtration member having a substantially cylindrical shape with a shorter length than the filtration member, an upper plate that supports the filtration member and the second filtration member with a predetermined gap therebetween, an upper through-hole being centrally formed in the upper plate, a first lower plate that covers a lower end surface of the filtration member, a lower through-hole being centrally formed in the first lower plate, and a second lower plate that covers a lower end surface of the second filtration member; the filter case includes an inflow hole through which liquid flows into the internal space, and an fitting cylinder through which liquid flows out and an outflow line that engages with the lower through-hole is disposed in the outflow hole. Accordingly, the surface area of the filtration member is increased, and the life of the filter element can be increased. Furthermore, by the length of the second filtration member being less than the length of the first filtration member, a steady oil flow post filtration can be achieved.

According to one or more embodiment of the present invention, air collected in an upper portion of the filter case can be discharged.

DESCRIPTION OF EMBODIMENTS

Below, detailed description of embodiments of the present invention will be given with reference to the drawings.

First Embodiment

Figure 1:
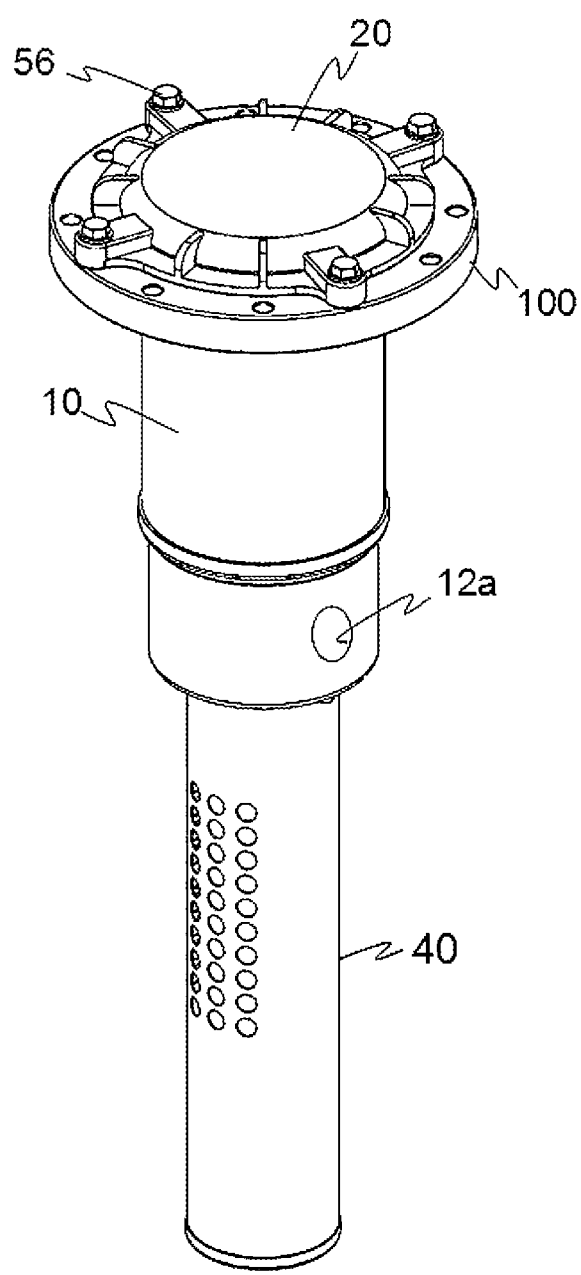
FIG. 1 is a diagram illustrating an overview of a return filter 1 according to an embodiment of the present invention.

FIG. 1 is a diagram illustrating an overview of a return filter 1 according to an embodiment of the present invention. The return filter 1 is a filtration device for removing dust and the like contained in oil which is installable inside a hydraulic oil tank (not illustrated) installed in a non-illustrated work machine (for example, a hydraulic device). Note that the return filter 1 is an example of a filtration device, and a filtration device of the present invention is not limited to a return filter. Additionally, in the present embodiment, the return filter 1 filters oil, however, a filtration device according to the present invention may filter liquid other than oil (for example, water).

Figure 2:
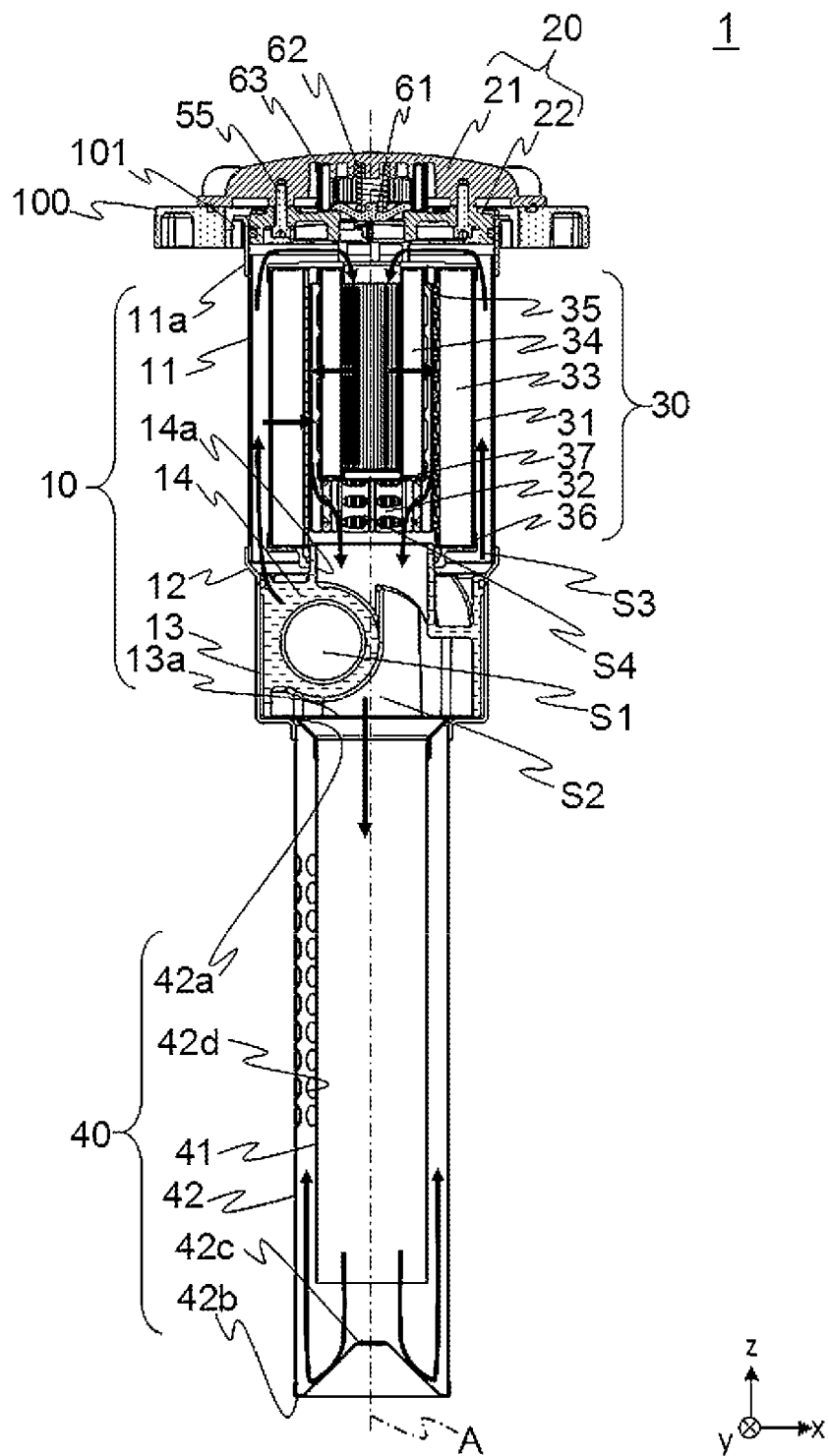
FIG. 2 is a cross-sectional view of the return filter 1.

FIG. 1 is a perspective view of the return filter 1. FIG. 2 is a cross-sectional view of the return filter 1. Note that in FIG. 2, the hatching indicating a cross section is partially omitted. Also, in FIG. 2, the flow of oil is indicated by arrows.

The return filter 1 mainly includes a filter case 10, a lid 20, a filter element 30, and a discharge portion 40. The return filter 1 is installable in a non-illustrated hydraulic oil tank via an attachment portion 100.

As illustrated in FIG. 2, the filter case 10 mainly includes a first filter case 11 with a substantially cylindrical shape, a second filter case 12 with a substantially cylindrical shape, a third filter case 13 with a bottomed substantially cylindrical shape, and a partition member 14. The filter case 10 overall has a bottomed substantially cylindrical shape, and is formed using a material with high corrosion resistance (for example, resin or SPCC).

The filter element 30 is provided inside the first filter case 11. An upper end of the first filter case 11 is attached to the attachment portion 100 via an attachment member 11a. The attachment member 11a is integrally formed with the first filter case 11 via welding or the like.

A lower end portion of the first filter case 11 is integrally formed with the second filter case 12 via welding or the like. An inflow hole 12a (see FIG. 1) through which oil flows into the space inside the filter case 10 is formed on a side surface of the second filter case 12. A lower end portion of the second filter case 12 is provided with a second discharge line 42 (detailed below) of the discharge portion 40.

The third filter case 13 with a bottomed substantially cylindrical shape is integrally formed with the inside of the second filter case 12 via welding or the like. An inflow hole (not illustrated) communicating with the inflow hole 12a is formed in a side surface of the third filter case 13. An outflow hole 13a through which oil filtered by the filter element 30 flows in is formed in a bottom surface of the third filter case 13.

The partition member 14 is provided on the inside of the third filter case 13. The partition member 14 partitions the internal space of the third filter case 13 into an inflow space S1 communicating with the inflow hole 12a and an outflow space S2 communicating with the discharge portion 40. A fitting cylinder 14a communicating with the outflow hole 13a is formed in the partition member 14.

The oil that has flowed in the inflow space S1 is introduced into an inflow space S3 between the first filter case 11 and the filter element 30. The inflow space S1 and the inflow space S3 are spaces through which liquid prior to passing through the filter element 30 flows.

Additionally, the oil filtered by the filter element 30 is introduced from an outflow space S4 to the outflow space S2. Thereafter, the oil filtered by the filter element 30 flows out to a first discharge line 41 (detailed below) of the discharge portion 40.

Figure 3:
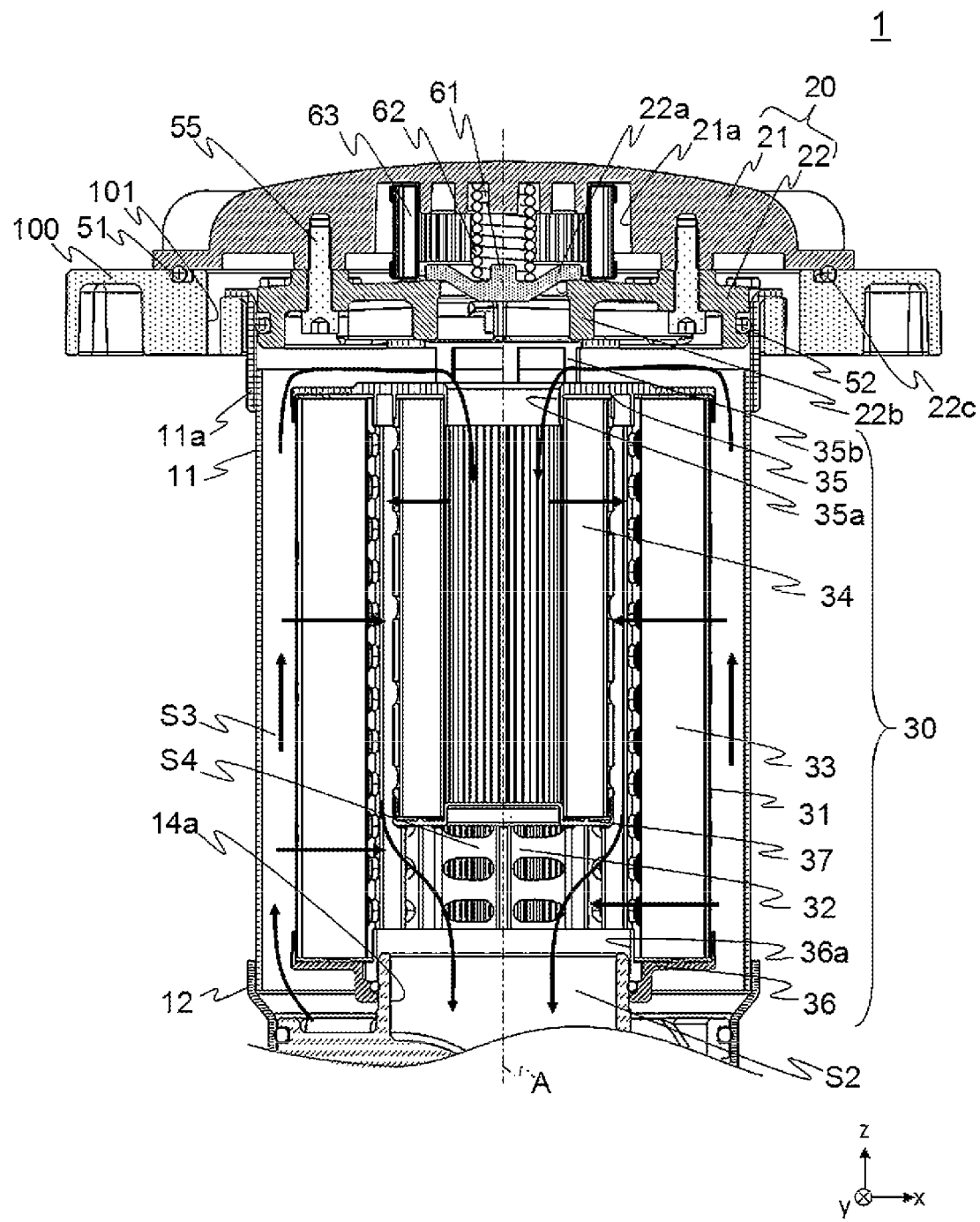
FIG. 3 is an enlarged view of a main portion of FIG. 2.

Next the lid 20 will be described. FIG. 3 is an enlarged view of a main portion of FIG. 2. Note that in FIG. 3, the hatching indicating a cross section is partially omitted. Also, in FIG. 3, the flow of oil is indicated by arrows.

The lid 20 mainly includes a cover 21 and a fitting portion 22. The cover 21 and the fitting portion 22 are members with a substantially circular plate shape and are formed using a material with high corrosion resistance (for example, stainless steel or resin).

The cover 21 is integrally formed with the fitting portion 22 via a screw 55. The cover 21 covers an upper end surface of the attachment portion 100. The fitting portion 22 engages with an inner circumferential surface of the attachment member 11a. Accordingly, the lid 20 covers an opening portion of the upper end of the first filter case 11, and an internal space (the inflow spaces S1, S3 and the outflow spaces S2, S4) is defined between the lid 20 and the filter case 10. Note that the cover 21 is fixed to the attachment portion 100 via a screw 56 (see FIG. 1).

A sealing member 51 is provided between the cover 21 and the attachment portion 100. The sealing member 51 is a circular member formed from an elastic member such as rubber. When the cover 21 is set on the attachment portion 100, the sealing member 51 elastically deforms. This prevents oil from leaking between the cover 21 and the attachment portion 100.

A groove 22c is formed in an outer circumferential surface of the fitting portion 22. A sealing member 52 is provided in the groove 22c. The sealing member 52 is a circular member formed from an elastic member such as rubber. When the fitting portion 22 engages with the inner circumferential surface of the attachment member 11a, the sealing member 52 elastically deforms. This prevents oil from leaking between the fitting portion 22 and the attachment member 11a. Additionally, the sealing member 52 elastically deforms to allow the lid 20 to be attached to the filter case 10.

A recessed portion 21a extending along a center axis A is formed in substantially the center of the cover 21. A through-hole 22a extending along a center axis A is formed in substantially the center of the fitting portion 22. The through-hole 22a defines a bypass flow path (detailed below).

Figure 4:
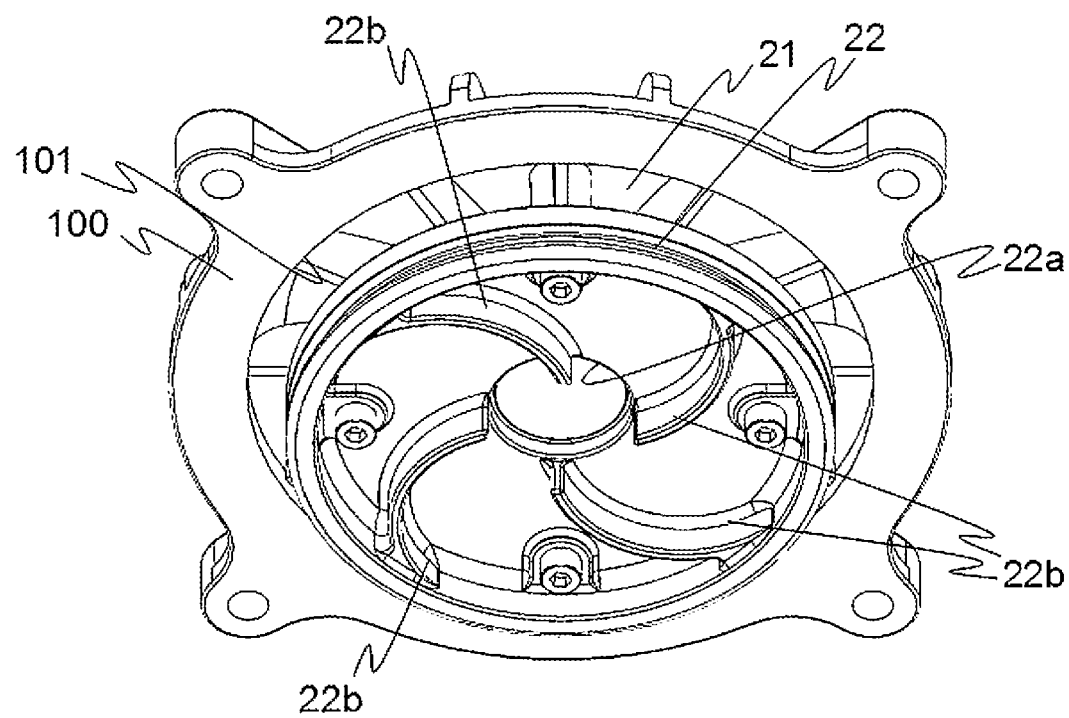
FIG. 4 is a perspective view of a lid 20 viewed from a back surface side (−z side).

FIG. 4 is a perspective view of the lid 20 viewed from a back surface side (−z side). A plurality of ribs 22b with an arc shape are formed surrounding the through-hole 22a on the back surface of the fitting portion 22. The ribs 22b are configured to generate a vortex in the oil flow.

Figure 5:
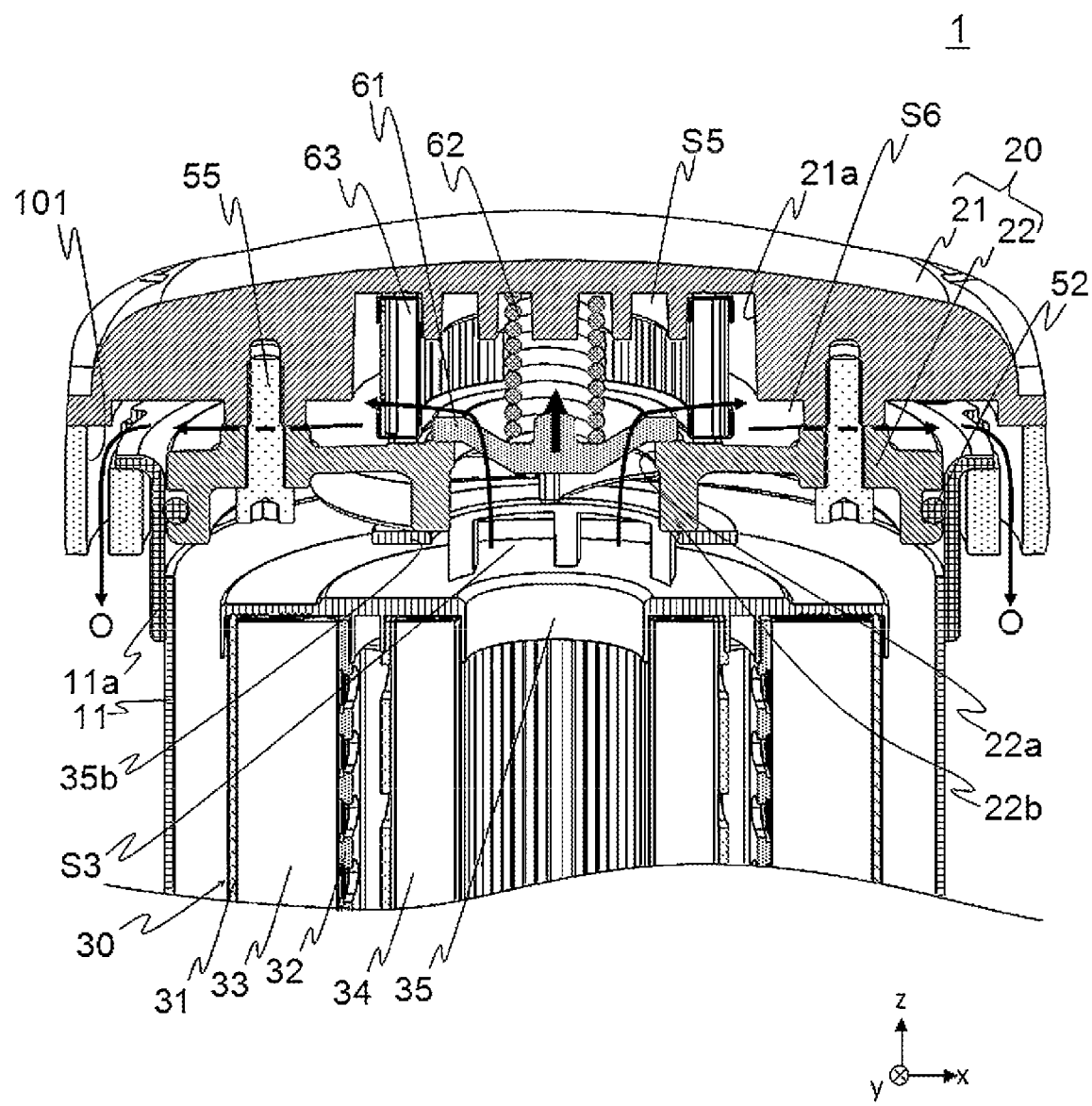
FIG. 5 is an enlarged view of a portion containing a central portion of the lid 20.

FIG. 5 is an enlarged view of a portion containing a central portion of the lid 20. The bypass flow path is defined between the cover 21 and the fitting portion 22 and connects the inflow space S3 and an outside space O (for example, the space inside a tank (not illustrated)) of the filter case 10 and the lid 20. The bypass flow path includes the through-hole 22a and a hole 101 formed in the attachment portion 100. A relief valve 61, an elastic member 62, and a relief strainer 63 are provided in the bypass flow path. The relief valve 61, the elastic member 62, and the relief strainer 63 will be described below.

The relief valve 61 is disposed covering an upper end surface of the through-hole 22a. The elastic member 62 abuts an upper end surface of the relief valve 61 at a first end and abuts a bottom surface of the recessed portion 21a at a second end. Thus, a force acting downward (−z direction) is applied to the relief valve 61 by the elastic member 62. In a normal state, the relief valve 61 pushes to close the through-hole 22a. This closes the bypass flow path and does not allow oil to flow out from the through-hole 22a.

The entire relief valve 61 is formed from a porous material. "Porous material" may be a material including a plurality of fine holes in the surface and the inner portion such as a foamed resin or a porous ceramic. The relief valve 61 functions as an air bleeder (detailed below).

When the pressure of the inflow space S3 increases, it acts against the elastic force of the elastic member 62 and the relief valve 61 is pushed upward (+z direction) (see the bold arrow in FIG. 5). In this way, the relief valve 61 moves between a position closing the bypass flow path and a position opening the bypass flow path.

When the relief valve 61 is pushed up and the bypass flow path is open, oil in the inflow space S3 flows through the through-hole 22a into a space S5. In FIG. 5, the flow of oil inside the bypass flow path is indicated by arrows. The relief strainer 63 is a member having substantially cylindrical shape.

The relief strainer 63 abuts an upper end surface of the fitting portion 22 at a first end and abuts a bottom surface of the recessed portion 21a at a second end. The oil in the space S5 is filtered by the relief strainer 63 and flows in a space S6 between the cover 21 and the fitting portion 22. The oil that has flowed in the space S6 is discharged through the hole 101 to the outside space O.

The oil that passes through the relief strainer 63 is oil unfiltered by the filter element 30. Thus, by the relief strainer 63 being provided, contaminated oil can be prevented from being discharged to the outside space O.

The description will now return to FIG. 3. The filter element 30 has an overall substantially cylindrical shape and mainly includes an outer cylinder 31; an inner cylinder 32; a first filtration member 33 disposed between the outer cylinder 31 and the inner cylinder 32; a second filtration member 34 disposed inward of the first filtration member 33; an upper plate 35 disposed on the upper end of the outer cylinder 31, the inner cylinder 32, the first filtration member 33, and the second filtration member 34; a first lower plate 36 disposed on the lower end of the outer cylinder 31, the inner cylinder 32, and the first filtration member 33; and a second lower plate 37 disposed on the lower end of the second filtration member 34.

The outer cylinder 31 and the inner cylinder 32 are members that have substantially hollow cylindrical shapes and include openings at both ends. The outer cylinder 31 and the inner cylinder 32 are formed using a material with high corrosion resistance (for example, stainless steel or resin). The inner cylinder 32 is housed inside the outer cylinder 31. The diameter of the inner cylinder 32 is less than that of the outer cylinder 31, and the height of the inner cylinder 32 and the height of the outer cylinder 31 are substantially equal.

A plurality of holes are formed in substantially the entire region of both the outer cylinder 31 and the inner cylinder 32. The holes formed in the outer cylinder 31 connect the outside of the outer cylinder 31 to the inside. The holes formed in the inner cylinder 32 connect the outside of the inner cylinder 32 to the inside. Note that a configuration including the outer cylinder 31 is not required.

The first filtration member 33 has a substantially hollow-cylindrical shape having a thickness in a radial direction. The first filtration member 33 is formed by pleating a sheet-like filter paper formed of a synthetic resin, paper, inorganic fiber (glass fiber or the like), and connecting both ends of the pleated filter paper to form a cylindrical shape. The length of the first filtration member 33 is substantially equal to the length of the outer cylinder 31 and the inner cylinder 32.

The liquid after passing through the holes formed in the outer cylinder 31 passes through the first filtration member 33, from the outside to the inside. At this time, impurities in the liquid are removed by the first filtration member 33. The liquid that passes to the inside of the first filtration member 33 passes through the holes formed in the inner cylinder 32 and flows into the inside of the inner cylinder 32.

The second filtration member 34 is similar to the first filtration member 33 in that it is formed by pleating a sheet-like filter paper formed of a synthetic resin, paper, inorganic fiber (glass fiber or the like) and connecting both ends of the pleated filter paper to form a cylindrical shape, and it has a substantially hollow-cylindrical shape having a thickness in a radial direction. The length of the second filtration member 34 is shorter than the length of the outer cylinder 31, the inner cylinder 32, and the first filtration member 33.

The upper plate 35 is a member with a bottomed substantially cylindrical shape, and is formed using a material with high corrosion resistance (for example, resin or stainless steel). The upper plate 35 supports the first filtration member 33 (including the outer cylinder 31 and the inner cylinder 32) and the second filtration member 34 with a predetermined gap therebetween. In this way, the second filtration member 34 is coaxially disposed with the first filtration member 33 inward of the first filtration member 33.

An upper through-hole 35a is centrally formed in the upper plate 35. The upper through-hole 35a abuts the inner circumferential surface of the second filtration member 34. Thus, the oil in the inflow space S3 flows to the inside of the second filtration member 34.

A projection portion 35b that projects upward (+z direction) is centrally formed in the upper plate 35. By the projection portion 35b and the ribs 22b being in contact with one another, the filter element 30 is pushed downward (−z direction), and the filter element 30 is fixed inside the filter case 10.

The first lower plate 36 is a member with a bottomed substantially cylindrical shape, and is formed using a material with high corrosion resistance (for example, resin or stainless steel). A lower through-hole 36a is centrally formed in the first lower plate 36. A fitting cylinder 14a engages with the lower through-hole 36a.

The second lower plate 37 is a member with a bottomed substantially cylindrical shape, and is formed using a material with high corrosion resistance (for example, resin or stainless steel). The second lower plate 37 is disposed covering the lower end of the second filtration member 34. Accordingly, the oil flowing from the inflow space S3 through the upper through-hole 35a to inside the second filtration member 34 is filtered by the second filtration member 34, then flows out to a region outside of the second filtration member 34 and inside of the inner cylinder 32.

The description will now return to FIG. 2. The discharge portion 40 mainly includes the first discharge line 41 and the second discharge line 42. The first discharge line 41 and the second discharge line 42 are members having a substantially cylindrical shape and are provided projecting downward (−z direction) from the bottom surface of the third filter case 13. The first discharge line 41 is coaxially disposed with the second discharge line 42 inward of the second discharge line 42.

The first discharge line 41 has a substantially cylindrical shape and includes an opening at both ends. The upper end of the first discharge line 41 and the outflow hole 13a are integrally formed via welding or the like. A hole is not formed in the side surface (cylindrical surface) of the first discharge line 41.

The second discharge line 42 has a substantially cylindrical shape covered at both ends and is provided surrounding the first discharge line 41. The diameter of the second discharge line 42 is greater than the diameter of the first discharge line 41, and the length of the second discharge line 42 is greater than the length of the first discharge line 41.

A first end 42a of the second discharge line 42 abuts the bottom surface of the third filter case 13 and has its outer circumference surrounded by the second filter case 12. The end 42a is integrally formed with the second filter case 12 and the third filter case 13 via welding or the like. A second end 42b of the second discharge line 42 is surrounded by a bottom surface cover 42c with a plate shape.

The bottom surface cover 42c has a substantially truncated cone shape and includes a tip end projecting inside the second discharge line 42 (projecting upward). Note that the configuration of the bottom surface cover is not limited to this configuration.

A plurality of discharge holes 42d are formed in the side surface (cylindrical surface) of the second discharge line 42. The discharge holes 42d are formed in a substantially semi-circumferential region that opposes the wall surface of the tank (not illustrated). However, the discharge holes 42d may be formed in the entire surface of the side surface of the second discharge line 42.

Next, the operation of the return filter 1 will be described using FIG. 2. The unfiltered oil that has flowed in from the inflow hole 12a (see FIG. 1) to the inflow space S1 is introduced to the inflow space S3 and then passes through the filter element 30.

The unfiltered oil in the inflow space S3 is filtered by the first filtration member 33 and flows out to the inside of the inner cylinder 32 (outflow space S4). The oil that has flowed from the inflow space S3 through the upper through-hole 35a to inside the second filtration member 34 is filtered by the second filtration member 34, then flows out to the outflow space S4.

The filter element 30 is a two-stage element including the first filtration member 33 and the second filtration member 34. Thus, the internal space of the filter element 30 is effectively used and the filtration performance can be improved. Additionally, by having two stages to the filtration member, the surface area of the filtration member is increased, and the life of the filter element 30 can be increased.

In particular, the length of the second filtration member 34 of the filter element 30 is shorter than the length of the first filtration member 33. Thus, after the oil passes through the first filtration member 33 and the second filtration member 34, the flow path surface area of the oil is not reduced and a steady oil flow can be provided.

When the oil in the inflow space S3 flows through the upper through-hole 35a to the inside of the second filtration member 34, it passes through the space between the lid 20 (fitting portion 22) and the upper plate 35. Here, by the oil flowing along the ribs 22b, a vortex is generated in the oil flow. Thus, the bubbles contained in the oil collect at the center of the vortex, i.e., at and around the through-hole 22a.

The through-hole 22a is covered by the relief valve 61, and the entire relief valve 61 is formed from a porous material. Because the relief valve 61 is formed from a porous material, air can pass through but oil cannot. Thus, the bubbles collected at and around the through-hole 22a pass through the fine holes in the relief valve 61 and are discharged out to the bypass flow path. In this way, air collected in the upper portion of the inflow space S3 can be discharged via the relief valve 61.

Should air collected in the upper portion of the inflow space S3 be unable to be bled, air collects between the upper plate 35 and the lid 20. When the amount of air collected increases, the flow of oil above the upper plate 35 is adversely affected, and ultimately oil may be unable to be supplied to the inside of the second filtration member 34. Additionally, when the amount of air collected increases, the first filtration member 33 at or near the upper end may become unusable. As a result, the filtration performance of the return filter 1 may decrease. However, by discharging the air collected in the upper portion of the inflow space S3 through the relief valve 61, the first filtration member 33 and the second filtration member 34 can work effectively, and the problems described above can be prevented.

In this way, the oil after filtration introduced to the outflow space S4 is introduced inside the fitting cylinder 14a (outflow space S2) and flows out to the first discharge line 41.

The oil flowing downward inside the first discharge line 41 hits the bottom surface cover 42c, and flows along the bottom surface cover 42c toward the outer circumferential surface of the second discharge line 42. Then, the oil hits the outer circumferential surface of the second discharge line 42 and changes direction to flow upward. Accordingly, an upward flow is made in the oil flowing downward from the first discharge line 41 inside the second discharge line 42, and the oil flowing upward naturally flows in the space between the first discharge line 41 and the second discharge line 42. Oil is discharged from the discharge holes 42d to the outside space O.

According to the present embodiment, by the entire relief valve 61 being formed from a porous material covering the through-hole 22a, the air collected in the upper portion of the inflow space S3 can be discharged from the relief valve 61. This allows the first filtration member 33 and the second filtration member 34 to work effectively, and the filtration performance to be improved. Additionally, because the relief valve 61 itself functions as an air bleeder, a simple configuration can be achieved.

Also, according to the present embodiment, the filter element 30 includes two filtration members, the first filtration member 33 and the second filtration member 34. Thus, the internal space of the filter element 30 is effectively used and the filtration performance can be improved. Additionally, by having two stages to the filtration member, the surface area of the filtration member is increased, and the life of the filter element 30 can be increased. Furthermore, by the length of the second filtration member 34 being less than the length of the first filtration member 33, a steady oil flow post filtration can be achieved.

Note that in the present embodiment, the filter element 30 includes two filtration members, the first filtration member 33 and the second filtration member 34. However, the second filtration member 34 is not required. Additionally, the discharge portion 40 includes the first discharge line 41 and the second discharge line 42. However, the second discharge line 42 is not required.

Second Embodiment

In the first embodiment, the entire relief valve 61 is formed from a porous material. Using the entire relief valve 61, the air collected in the upper portion of the inflow space S3 is discharged. The configuration for discharging air collected in the upper portion of the inflow space S3 is not limited to this configuration.

A return filter 2 according to a second embodiment includes an air bleeder member disposed separate from a relief valve. The return filter 2 will be described below. The only difference between the return filter 1 and the return filter 2 is the structure of the air bleeder of the relief valve. Below, the same components as those in the first embodiment are denoted by the same reference numerals, and descriptions thereof will be omitted.

Figure 6:
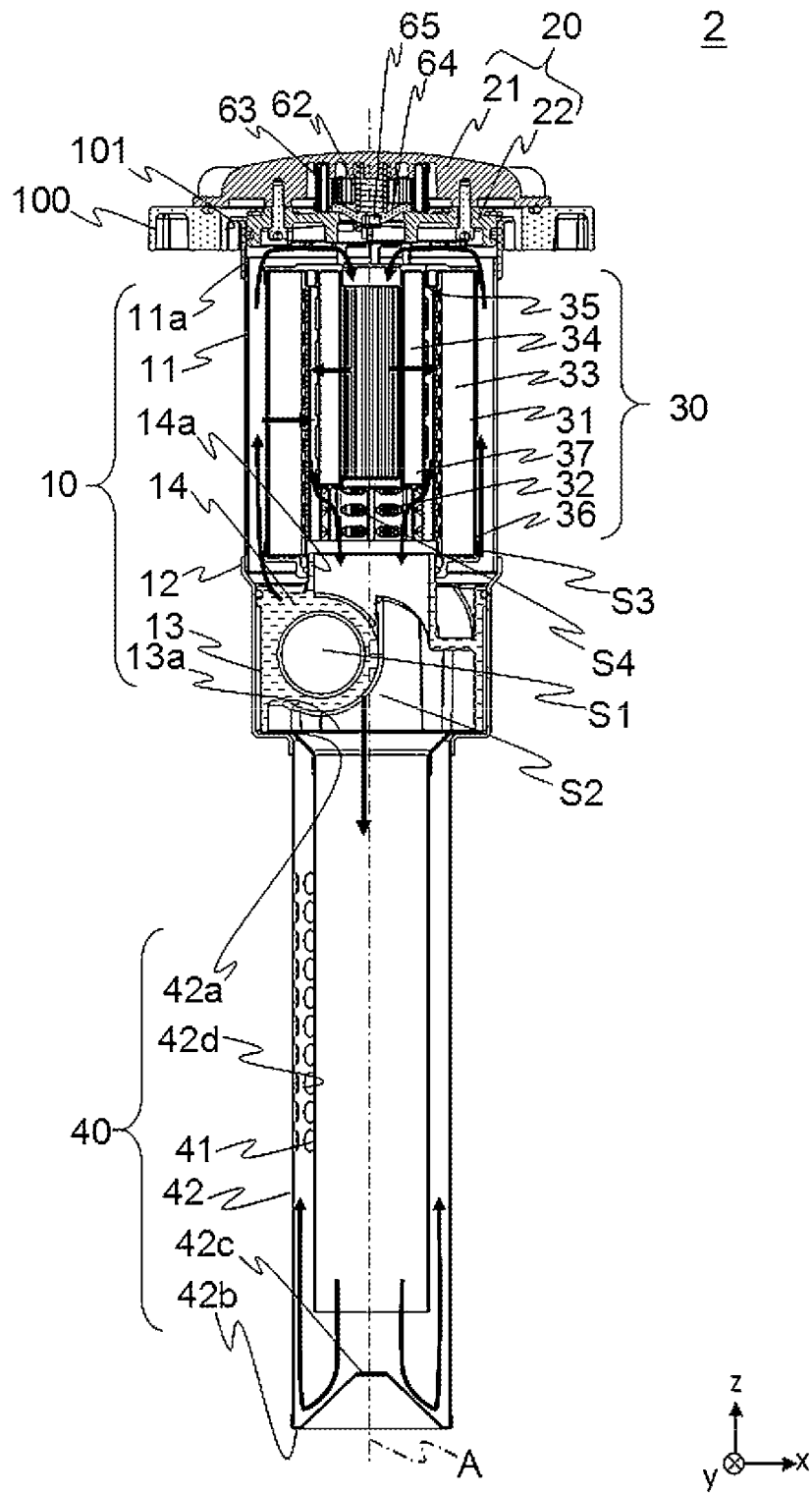
FIG. 6 is a cross-sectional view illustrating a return filter 2 according to an embodiment of the present invention.

FIG. 6 is a cross-sectional view illustrating the return filter 2 according to an embodiment of the present invention. Note that in FIG. 6, the hatching indicating a cross section is partially omitted. A relief valve 64, an air bleeder member 65, the elastic member 62, and the relief strainer 63 are provided in the bypass flow path between the cover 21 and the fitting portion 22.

Figure 7:
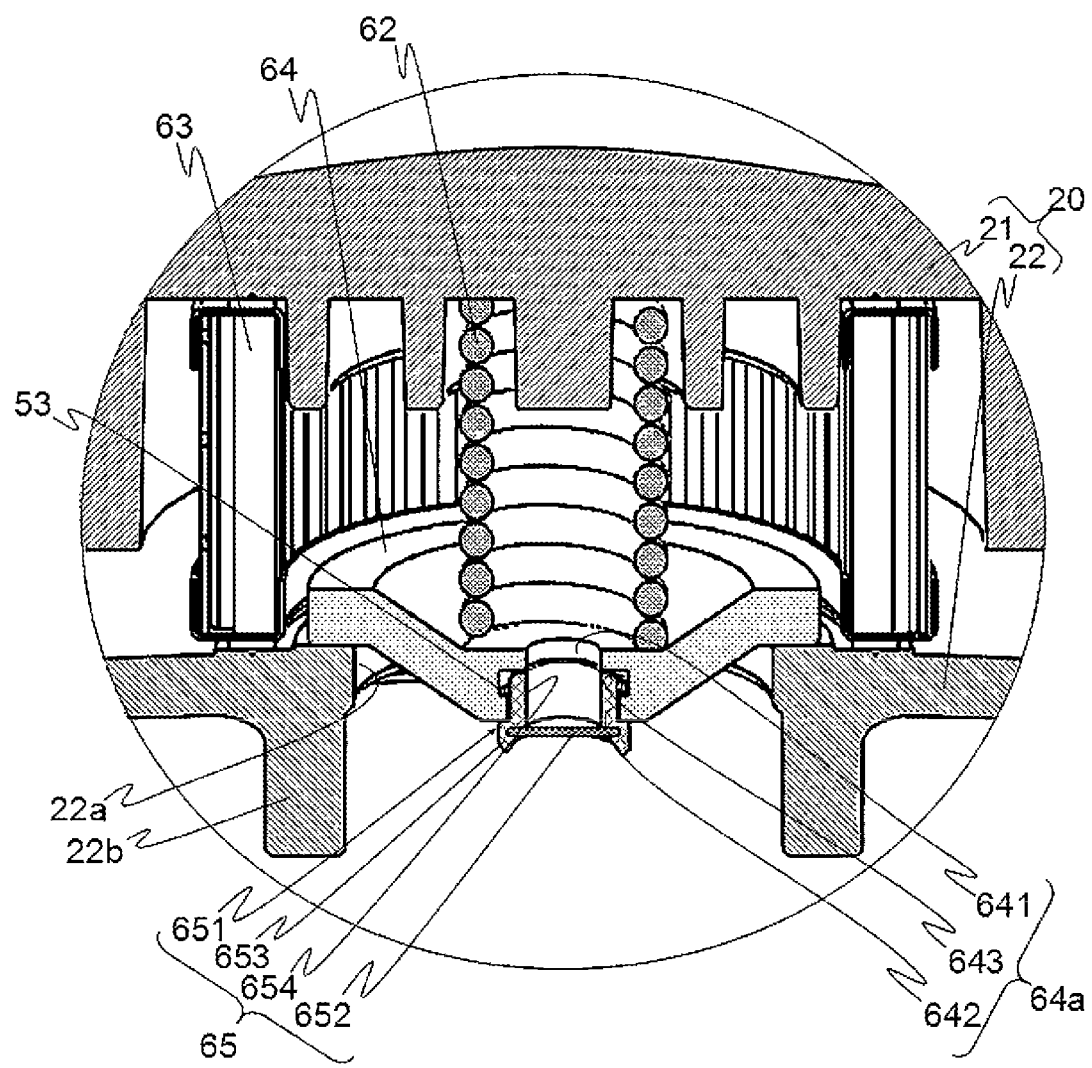
FIG. 7 is an enlarged view of a portion containing a central portion of the lid 20.

FIG. 7 is an enlarged view of a portion containing a central portion of the lid 20. The relief valve 64 is disposed covering an upper end surface of the through-hole 22a. A force acting downward (−z direction) is applied to the relief valve 64 by the elastic member 62.

The relief valve 64 is formed using a material having high corrosion resistance (for example, resin or aluminum). A through-hole 64a extending through the relief valve 64 in the thickness direction is formed in the substantial center of the relief valve 64.

The through-hole 64a includes a through portion 641 with the smallest diameter, a recessed portion 642 with a larger diameter than the through portion 641, and a groove 643 formed in the inner circumferential surface of the recessed portion 642. The air bleeder member 65 is inserted in the recessed portion 642. The groove 643 is provided with a sealing member 53.

The air bleeder member 65 mainly includes an attachment portion 651 and a coin filter 652. The attachment portion 651 is a member with a substantially cylindrical shape including a flange portion 653 and defines a through-hole 654 that communicates with the through portion 641. The coin filter 652 configured to close the through-hole 654 is provided in the flange portion 653.

The coin filter 652 is a plate member formed from a porous material. "Porous material" may be a material including a plurality of fine holes in the surface and the inner portion such as a foamed resin, a porous ceramic, or a porous metal. Note that the surface of the coin filter 652 may be coated to give the coin filter 652 water repellency.

When the attachment portion 651 provided with the coin filter 652 is inserted in the recessed portion 642, the annular sealing member 53 formed from an elastic member such as rubber elastically deforms, preventing oil from leaking between the through-hole 64a and the air bleeder member 65.

Next, in the return filter 2, a method of discharging air collected in the upper portion of the inflow space S3 will be described.

The through-hole 22a is surrounded by the relief valve 64, and the coin filter 652 is provided in the relief valve 64 to close the through-hole 654 (i.e., the through-hole 64a). Because the coin filter 652 is formed from a porous material, air can pass through but oil cannot. Thus, the bubbles collected at and around the through-hole 22a pass through the fine holes in the coin filter 652 and are discharged out to the bypass flow path.

According to the present embodiment, air collected in the upper portion of the inflow space S3 can be discharged through the coin filter 652 formed from a porous material. This allows the first filtration member 33 and the second filtration member 34 to work effectively, and the filtration performance to be improved.

Additionally, according to the present embodiment, the air bleeder member 65 provided with the coin filter 652 is provided as a separate member from the relief valve 64. This allows the air bleeder member 65, i.e., the coin filter 652 to be replaced by removing the air bleeder member 65 from the relief valve 64 when the coin filter 652 is damaged or needs to be cleaned. Accordingly, air discharge performance can be maintained.

Third Embodiment

In the second embodiment, the relief valve 64 includes an air bleeder member 65. However, the air bleeder member 65 which can be inserted in the through-hole 64a is not limited in where it is provided.

In a return filter 3 according to a third embodiment, the air bleeder member 65 is provided in the filter element 30. The return filter 3 will be described below. Note that the same components as those in the first embodiment and the second embodiment are denoted by the same reference numerals, and descriptions thereof will be omitted.

Figure 8:
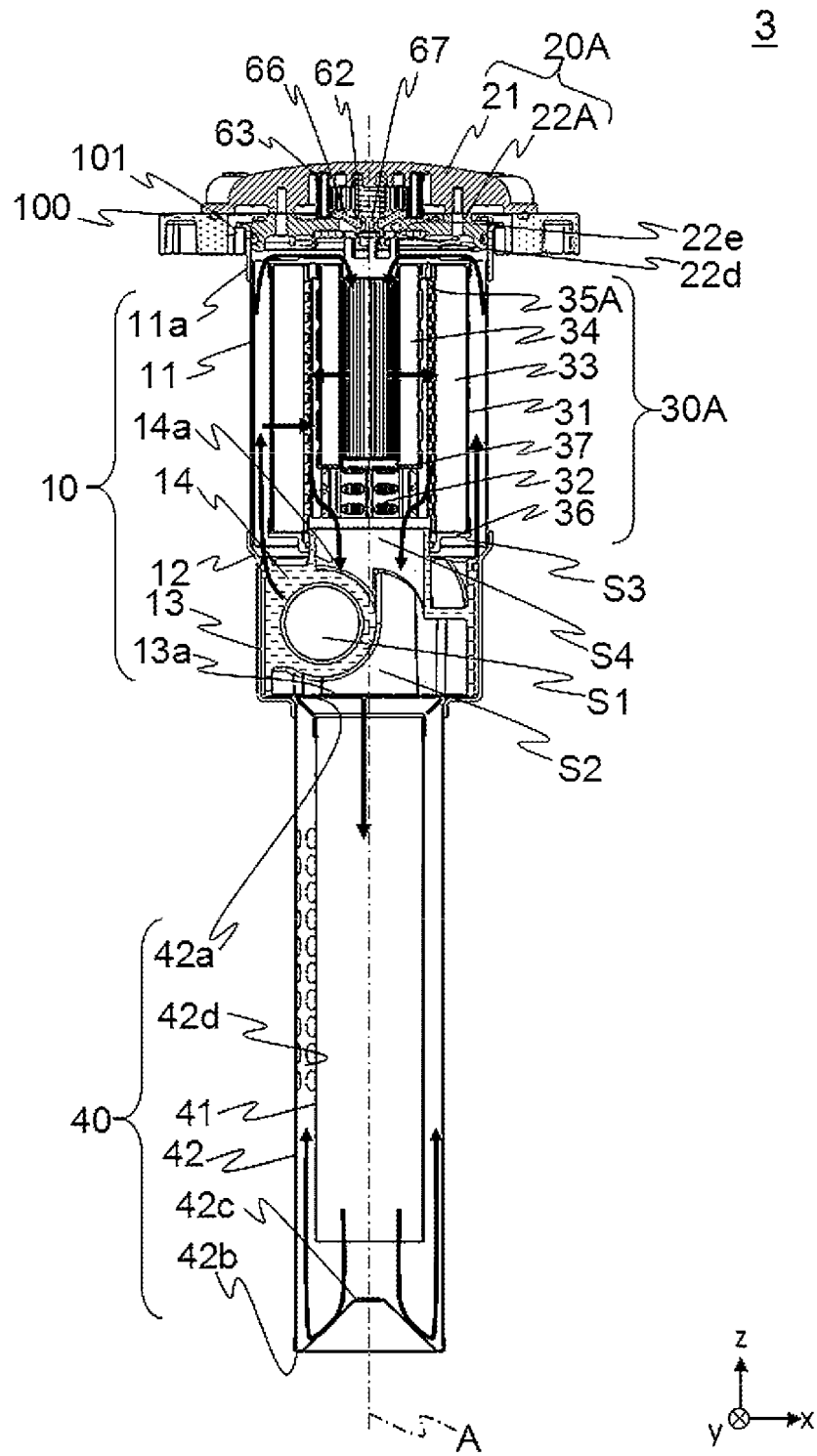
FIG. 8 is a cross-sectional view illustrating a return filter 3 according to an embodiment of the present invention.

FIG. 8 is a cross-sectional view illustrating the return filter 3 according to an embodiment of the present invention. Note that in FIG. 8, the hatching indicating a cross section is partially omitted. The return filter 3 mainly includes a filter case 10, a lid 20A, a filter element 30A, and a discharge portion 40.

Figure 9:
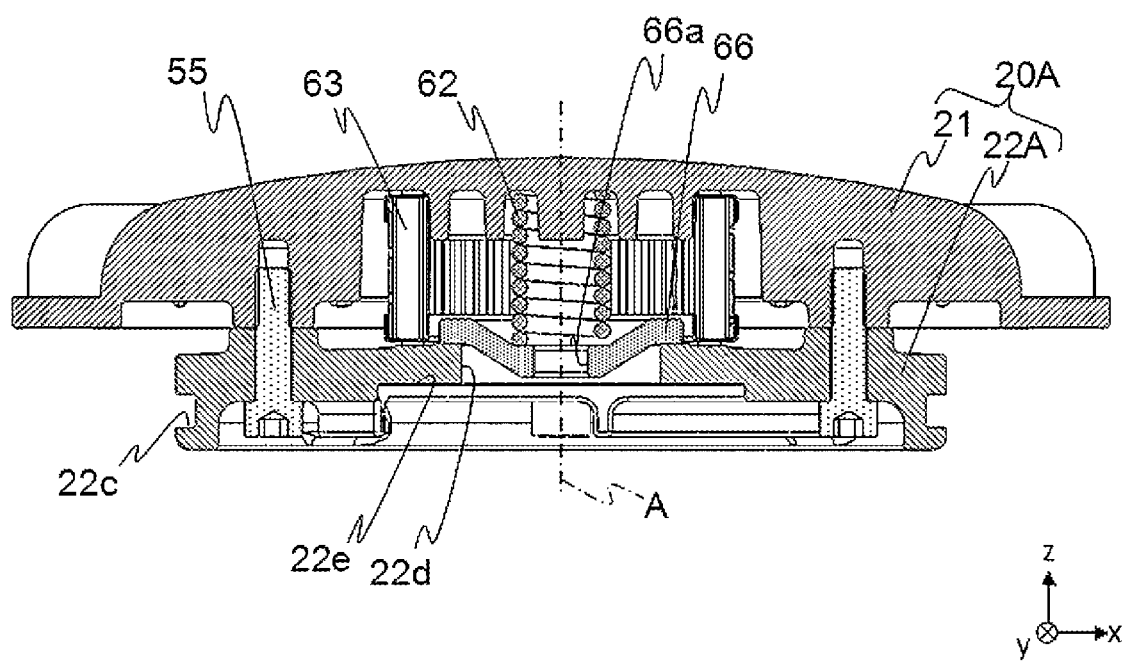
FIG. 9 is an enlarged view of a main portion of FIG. 8.

FIG. 9 is an enlarged view of a main portion of FIG. 8. The lid 20A mainly includes a cover 21 and a fitting portion 22A. The fitting portion 22A is similar to the fitting portion 22 and is a member with a substantially circular plate shape and is formed using a material with high corrosion resistance (for example, stainless steel or resin). The cover 21 is integrally formed with the fitting portion 22A via the screw 55.

The fitting portion 22A is similar to the fitting portion 22 and the outer circumferential surface of the fitting portion 22A engages with the inner circumferential surface of the attachment member 11a (not illustrated in FIG. 9, see FIG. 8). The groove 22c is formed in the outer circumferential surface of the fitting portion 22. The sealing member 52 (not illustrated in FIG. 9, see FIG. 8) is provided in the groove 22c. When the fitting portion 22A engages with the inner circumferential surface of the attachment member 11a, the sealing member 52 elastically deforms and the lid 20A is attached to the filter case 10. This prevents oil from leaking between the fitting portion 22A and the attachment member 11a.

A through-hole 22d extending along a center axis A is formed in the substantial center of the fitting portion 22A. The through-hole 22d defines a bypass flow path. A recessed portion 22e that abuts a projection portion 35c (detailed below) is formed in the back surface of the fitting portion 22A.

A relief valve 66, an air bleeder member 67 (not illustrated in FIG. 9, see FIG. 8), the elastic member 62, and the relief strainer 63 are provided in the bypass flow path between the cover 21 and the fitting portion 22A.

The relief valve 66 is disposed covering the upper end surface of the through-hole 22d. A force acting downward (−z direction) is applied to the relief valve 66 by the elastic member 62.

The relief valve 66 is formed using a material having high corrosion resistance (for example, resin or aluminum). A through-hole 66a extending through the relief valve 66 in the thickness direction is formed in the substantial center of the relief valve 66. The air bleeder member 67 (detailed below) is inserted in the through-hole 66a.

Figure 10:
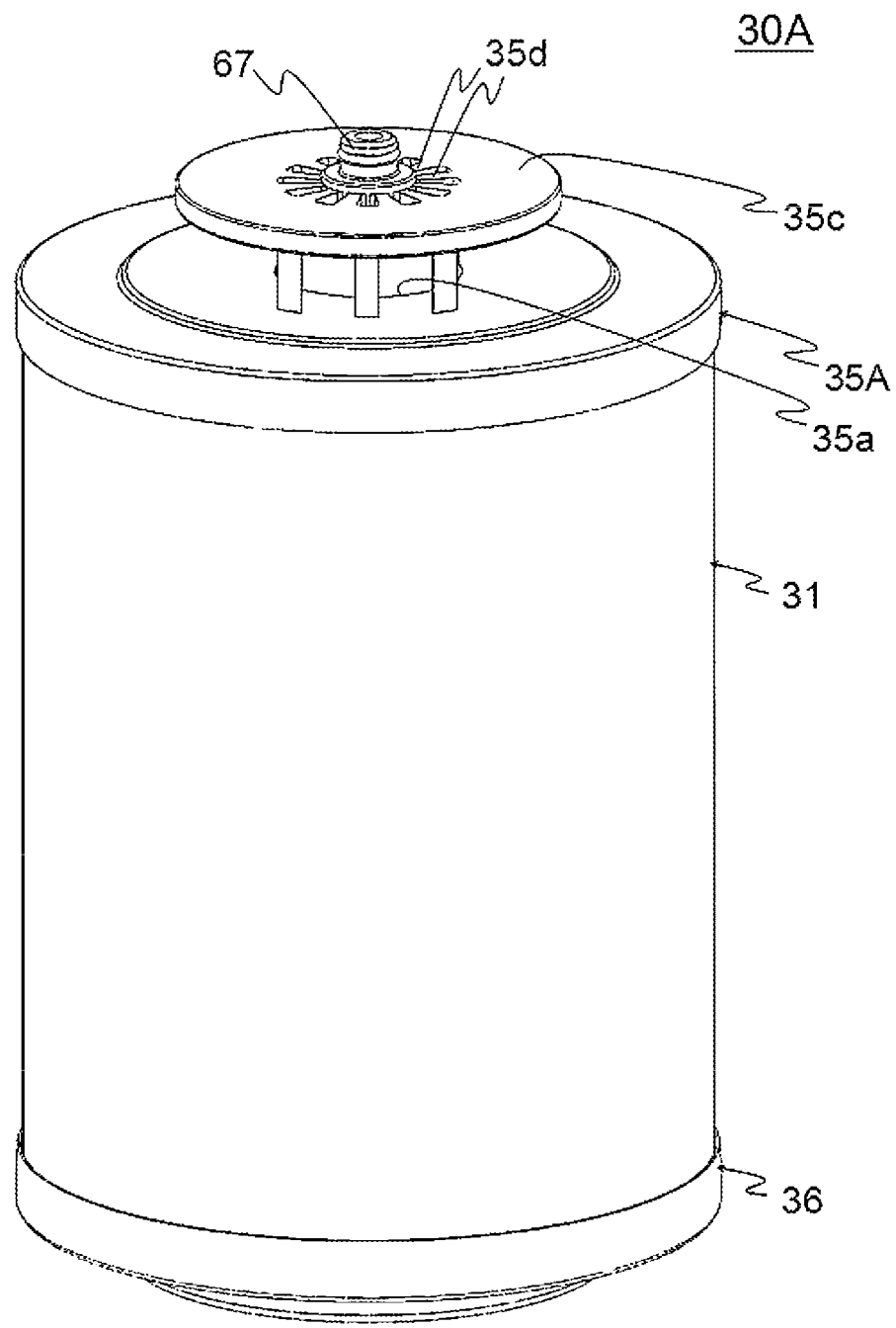
FIG. 10 is a perspective view of a filter element 30A.

FIG. 10 is a perspective view of the filter element 30A. The filter element 30A is similar to the filter element 30 and overall has a substantially cylindrical shape. The filter element 30A mainly includes the outer cylinder 31, the inner cylinder 32 (not illustrated in FIG. 10), the first filtration member 33 (not illustrated in FIG. 10), the second filtration member 34 (not illustrated in FIG. 10), an upper plate 35A, the first lower plate 36, and the second lower plate 37 (not illustrated in FIG. 10).

The upper plate 35A is similar to the upper plate 35 and is a member with a bottomed substantially cylindrical shape, and is formed using a material with high corrosion resistance (for example, resin or stainless steel). The upper plate 35A is provided on the upper end of the outer cylinder 31, the inner cylinder 32, the first filtration member 33, and the second filtration member 34, and supports the first filtration member 33 (including the outer cylinder 31 and the inner cylinder 32) and the second filtration member 34 with a predetermined gap therebetween.

The upper through-hole 35a is centrally formed in the upper plate 35. The projection portion 35c that projects upward (+z direction) is centrally formed in the upper plate 35. The air bleeder member 67 is provided on the projection portion 35c projecting upward (+z direction).

Figure 11:
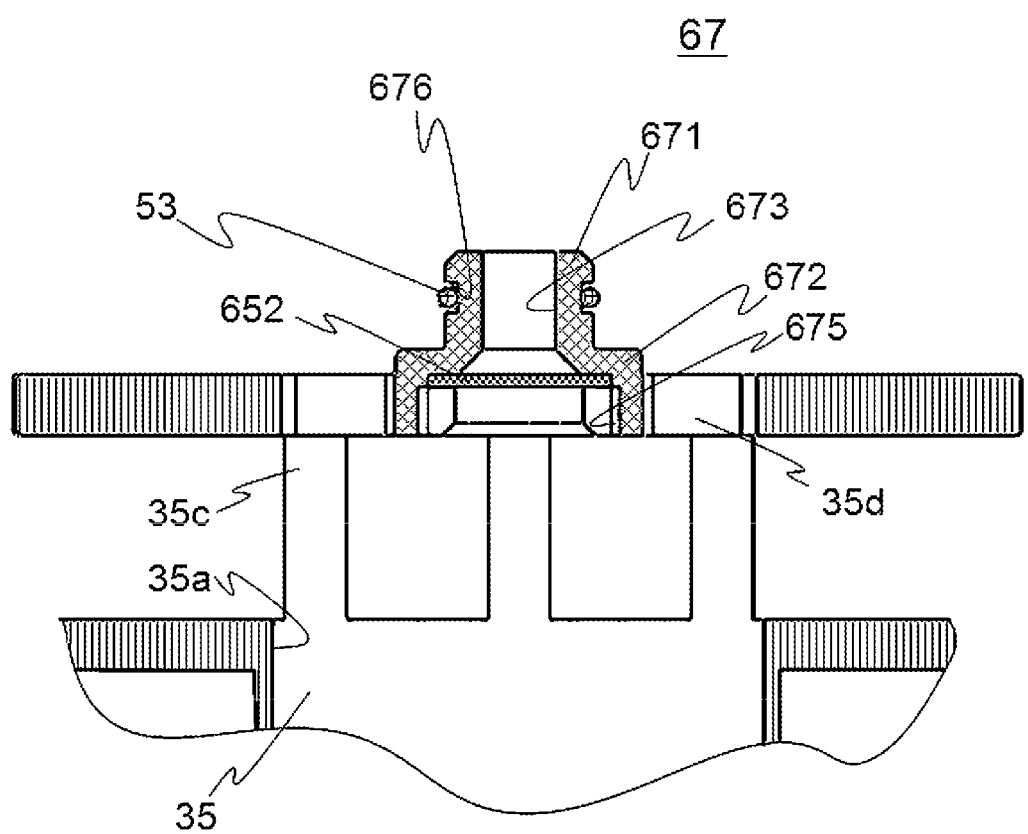
FIG. 11 is a diagram illustrating an air bleeder member 67 in detail.

FIG. 11 is a diagram illustrating the air bleeder member 67 in detail. The air bleeder member 67 mainly includes an attachment portion 671 and the coin filter 652.

The attachment portion 671 is a member with a substantially cylindrical shape including a flange portion 672 and a centrally formed through-hole 673 that extends along the axial direction. By the outer circumferential surface of the flange portion 672 engaging with the inner circumferential surface of an insert portion 35d formed on the projection portion 35c (see FIG. 10), the attachment portion 671 is installed in the projection portion 35c.

A recessed portion 675 is formed in the lower (−z side) surface of the flange portion 672. The coin filter 652 configured to close the through-hole 673 is provided inside the recessed portion 675.

A groove 676 is formed in the outer circumference of the attachment portion 671. The circular sealing member 53 formed from an elastic member such as rubber is provided in the groove 676.

Figure 12:
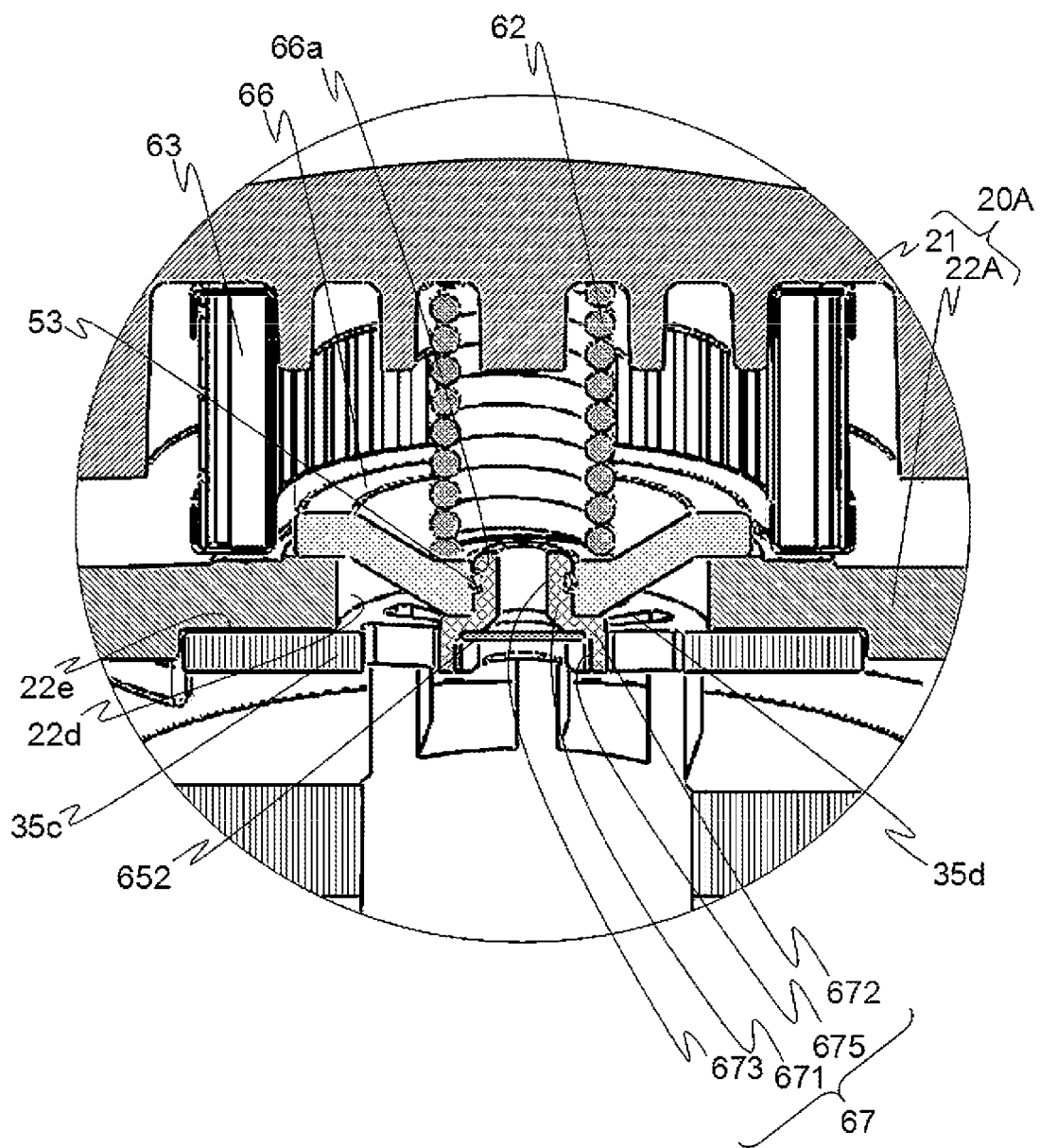
FIG. 12 is an enlarged view of a portion containing a central portion of a lid 20A.

FIG. 12 is an enlarged view of a portion containing a central portion of the lid 20A. When the lid 20A is pushed downward (−z direction) until the bottom surface of the recessed portion 22e abuts the projection portion 35c and the lid 20A is attached to the attachment portion 100, the filter element 30 is pressed downward (−z direction). The attachment portion 671 is concurrently inserted in the through-hole 66a. Accordingly, the sealing member 53 elastically deforms, and oil is prevented from leaking between the through-hole 66a and the attachment portion 671.

Because the coin filter 652 is formed from a porous material, air can pass through but oil cannot. Thus, the bubbles collected at and around the through-hole 22a pass through the fine holes in the coin filter 652 and are discharged out to the bypass flow path.

According to the present embodiment, by the through-hole 673 being covered with the coin filter 652 formed from a porous material, air collected in the upper portion of the inflow space S3 can be discharged. This allows the first filtration member 33 and the second filtration member 34 to work effectively, and the filtration performance to be improved.

Additionally, according to the present embodiment, because the air bleeder member 67 is provided in the filter element 30A, when the filter element 30A is replaced, the air bleeder member 67, i.e., the coin filter 652, is also replaced. By regularly replacing the coin filter 652 in this manner, the air discharge performance can be maintained.

Embodiments of the invention have been described in detail with reference to the drawings; however, specific configurations are not limited to the embodiments, and changes in the design or the like are also included within a scope which does not depart from the gist of the invention. A person skilled in the art can easily modify, add, and convert each element in the above embodiments as appropriate.

Further, the term "substantially" in the present invention is a concept that includes variations and modifications to an extent that does not result in loss in identity. For example, the term "substantially equal" is not limited to being strictly equal, and is a concept that includes variations within degrees of equality. Further, the simple expression of "equal", for example, includes "substantially equal," and does not only mean strictly equal. Furthermore, the meaning of the term "at or near" in the present invention includes a region of a range (which can be determined as desired) near a position serving as a reference. For example, "in the vicinity of A" refers to a region of a range near A, and is a concept indicating that A may or may not be included.

REFERENCE SIGNS LIST 1, 2, 3 Return filter
10 Filter case
11 First filter case
11a Attachment member
12 Second filter case
12a Inflow hole
13 Third filter case
13a Outflow hole
14 Partition member
14a Fitting cylinder
20, 20A Lid
21 Cover
21a Recessed portion
22, 22A Fitting portion
22a Through-hole
22b Rib
22c Groove
22d Through-hole
22e Recessed portion
30, 30A Filter element
31 Outer cylinder
32 Inner cylinder
33 First filtration member
34 Second filtration member
35, 35A Upper plate 35a Upper through-hole
35b Projection portion
35c Projection portion
35d Insert portion
36 First lower plate
36a Lower through-hole
37 Second lower plate
40 Discharge portion
41 First discharge line
42 Second discharge line
42a End
42b End
42c Bottom surface cover
42d Discharge hole
51, 52, 53 Sealing member
55, 56 Screw
61, 64 Relief valve
62 Elastic member
63 Relief strainer
64a Through-hole
65, 67 Air bleeder member
66, Relief valve
66a Through-hole
100 Attachment portion
101 Hole
641 Through portion
642 Recessed portion
643 Groove
651 Attachment portion
652 Coin filter
653 Flange portion
654 Through-hole
671 Attachment portion
672 Flange portion
673 Through-hole
675 Recessed portion
676 Groove

The invention claimed is:

1. A filter device, comprising:
a filter element comprising a filtration member having a substantially cylindrical shape;
a filter case having a bottomed substantially cylindrical shape inside which the filter element is disposed;
a lid that covers an opening portion formed at an upper end of the filter case and defines an internal space between the lid and the filter case, a bypass flow path connecting the internal space and outside space of the filter case being formed in the lid; and
a relief valve disposed moveably between a position closing the bypass flow path and a position opening the bypass flow path,
wherein a hole defining the bypass flow path is formed in the lid; and
the relief valve is a plate-shaped portion that covers the hole and is formed entirely of a porous material.

2. The filter device according to claim 1, wherein
the filter element comprises
the filtration member,
a second filtration member disposed inward of the filtration member and coaxial with the filtration member, the second filtration member having a substantially cylindrical shape with a shorter length than the filtration member,
an upper plate that supports the filtration member and the second filtration member with a predetermined gap therebetween, an upper through-hole being centrally formed in the upper plate,
a first lower plate that covers a lower end surface of the filtration member, a lower through-hole being centrally formed in the first lower plate, and
a second lower plate that covers a lower end surface of the second filtration member;
the filter case comprises
an inflow hole through which liquid flows into the internal space, and
an outflow hole through which liquid flows out; and
a fitting cylinder that engages with the lower through-hole is disposed in the outflow hole.

3. A filter device, comprising:
a filter element comprising a filtration member having a substantially cylindrical shape;
a filter case having a bottomed substantially cylindrical shape inside which the filter element is disposed;
a lid that covers an opening portion formed at an upper end of the filter case and defines an internal space between the lid and the filter case, a bypass flow path connecting the internal space and outside space of the filter case being formed in the lid; and
a relief valve disposed moveably between a position closing the bypass flow path and a position opening the bypass flow path,
wherein
a hole defining the bypass flow path is formed in the lid;
the relief valve covers the hole;
a through-hole that connects the internal space and the outside space is formed in the relief valve;
the air bleeder is disposed covering the through-hole; and
the air bleeder is a plate-shaped portion that is formed entirely of a porous material.

4. The filter device according to claim 3, wherein
the filter element comprises an upper plate that covers an upper end surface of the filtration member;
the air bleeder is disposed on the upper plate; and
the air bleeder covers the through-hole.

* * * * *